United States Patent Office 3,278,552
Patented Oct. 11, 1966

3,278,552
BENZOTHIOPHENES
Emil J. Geering, Grand Island, N.Y., assignor to Hooker Chemical Corporation, Niagara Falls, N.Y., a corporation of New York
No Drawing. Filed Apr. 5, 1963, Ser. No. 270,791
21 Claims. (Cl. 260—330.5)

This invention relates to compounds containing a thiophene ring fused to an aromatic ring or fused to an aromatic ring system, to methods of making them, and to their use as pesticides.

According to the process of the invention, the initial starting material is a substituted methane or a substituted ethane which results from heating a substituted methane with sulfur. The substituted ethane is heated with sulfur to yield a substituted ethylene which is further heated with sulfur to yield the desired product. Any of these initial or intermediate starting materials can be directly heated with sulfur to yield the product.

The initial starting material in the present invention is one which is first converted to a derivative of ethylene when heated with sulfur, by coupling, dehalogenation, dehydrohalogenation or other action. Included within the initial starting materials of the invention are materials selected from the group consisting of (a)

and (b)

where X' is chlorine or bromine, Y' is hydrogen, chlorine, or bromine, Z' is chlorine or bromine or the radical (ArCX$_2$'—), where Ar is aryl or substituted aryl; and wherein X² is chlorine, bromine, fluorine, aryl, or substituted aryl, and wherein W is an aryl or substituted aryl substituent having a hydrogen atom adjacent the W—C bond.

Of the initial starting materials selected from group (a), the starting material is an ethane when Z' is the radical (Ar—CX$_2$'—), and in the other cases is a tri- or di-halo-substituted methyl group on an aryl nucleus which is converted to an ethane upon heating with sulfur. The initial starting materials selected from group (b) are ethanes.

The initial starting materials are typically converted to ethylene derivatives as shown by the following equations:

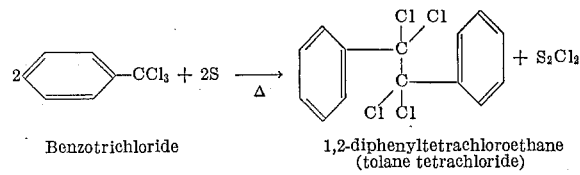

Benzotrichloride      1,2-diphenyltetrachloroethane (tolane tetrachloride)

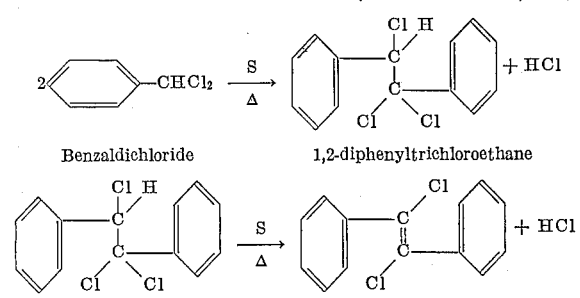

Benzaldichloride      1,2-diphenyltrichloroethane

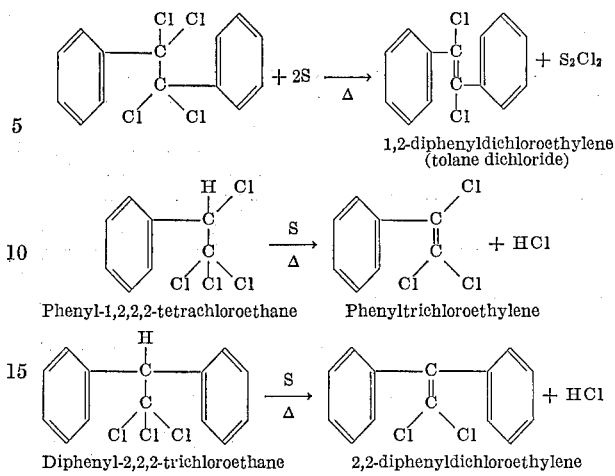

1,2-diphenyldichloroethylene (tolane dichloride)

Phenyl-1,2,2,2-tetrachloroethane    Phenyltrichloroethylene

Diphenyl-2,2,2-trichloroethane    2,2-diphenyldichloroethylene

The intermediate ethylene starting materials used in the present invention, including those made from the initial starting materials are defined as a 1-aryl-2-haloethylene wherein the aryl member can be substituted and the halogen is chlorine or bromine. Included within this definition are compounds having the formula:

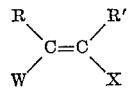

where W is an aryl or substituted aryl substituent having at least one position adjacent the W—C bond substituted by hydrogen, R and R' are fluorine, bromine, chlorine, aryl or substituted aryl substituents or are atoms of an aromatic ring or ring system, and where X is chlorine or bromine.

The intermediate ethylene starting materials form thiophene rings when heated with sulfur through the interaction of the C-X bond as follows:

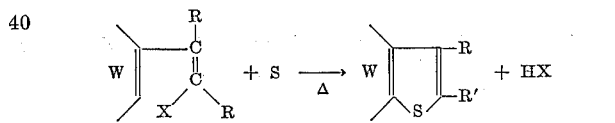

where W, R, and R' and X are as previously defined, and this is accompanied by the splitting out of the corresponding hydrogen halide. The following additional equations further illustrate the reaction:

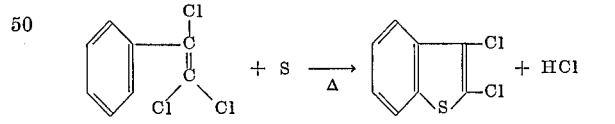

2,3-dichlorobenzo [b] thiophene

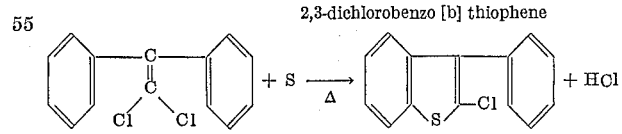

2-chloro-3-phenylbenzo [b] thiophene

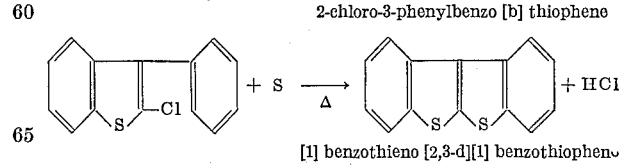

[1] benzothieno [2,3-d][1] benzothiophene

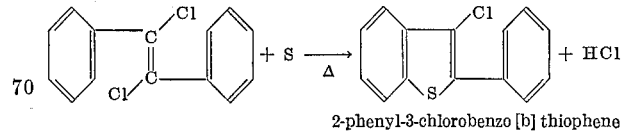

2-phenyl-3-chlorobenzo [b] thiophene

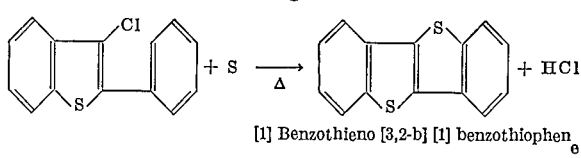

[1] Benzothieno [3,2-b] [1] benzothiophene

The present process is accomplished by heating a solution or suspension of sulfur in the starting material. As indicated by the foregoing series of reactions, the reaction can be considered to proceed through one or more stages, and the progress of the reactions can be followed by monitoring the evolution of $S_2Cl_2$ or HCl as the case may be. These phenomenon facilitate the control of the reactions to the production of the desired compounds on a commercial scale. The complete reaction of all sulfur-reactive groups is indicated by the cessation of the evolution of hydrogen halide.

The preferred temperature range for the processes of the invention is from about 100 to about 300 degrees centigrade. However temperatures up to 400 degrees centigrade or even up to just below the decomposition temperature of the reactants and products can be used if desired. The reaction time can vary widely, but generally ranges from one or a few hours up to a day or more.

Various rations of sulfur to starting materials can be used, and the preferred ratios are dependent on the starting materials and the desired end product. Thus when a substituted methane is converted to a benzothieno-benzothiophene, up to about six moles of sulfur per mole of substituted methane can be employed. Generally, when intermediate ethylene compounds are converted to benzothiophenes or benzothieno-benzothiophenes, the stoichiometric amount of sulfur can be be employed.

The product can be separated and purified by distillation, crystallization, sublimation, and other equivalent processes known in the art, which will be more fully described in the examples to follow.

Of the initial starting materials of the formula

X′ is preferably chlorine, Y′ is preferably chlorine or hydrogen, and Z′ is preferably chlorine. Typical compounds of the type are benzotrichloride;
benzotribromide;
trichloromethylnaphthalene;
trichloromethylthiophene;
trichloromethylbenzo[b]thiophene;
para-chlorobenzotrichloride;
para-methylbenzotrichloride;
para-methoxybenzotrichloride;
para-propoxybenzotrichloride;
benzaldichloride;
benzaldibromide;
para-chlorobenzaldichloride;
para-propylbenzaldichloride;
1,2-diphenyltetrachloroethane;
1,2-diphenyltetrabromoethane;
1,2-bis(4-chlorophenyl)tetrachloroethane;
1,2-ditolyltetrachloroethane;
1,2-bis(4-methoxyphenyl)tetrachloroethane;
1,2-diphenyltrichloroethane;
1,2-diphenyltribromoethane, and
1,2-bis(4-chlorophenyl)trichloroethane.

As to initial starting materials of the formula

X′ is preferably chlorine, and the choice of $X^2$ depends upon the end product desired. Typical compounds of the formula are phenyl-1,2,2,2-tetrachloroethane;
phenyl-1,2,2,2-tetrabromoethane;
(1-naphthyl)-1,2,2,2-tetrachloroethane;
(2-thienyl)-1,2,2,2-tetrachloroethane;
2-benzo[b]thienyl)-1,2,2,2-tetrachloroethane;
diphenyl-2,2,2-trichloroethane;
diphenyl-2,2,2-tribromoethane;
phenyl(4-chlorophenyl)-2,2,2-tribromoethane;
bis(chlorophenyl)-2,2,2-trichloroethane;
ditolyl-2,2,2-trichloroethane, and
bis(4-methoxyphenyl)-2,2,2-trichloroethane.

With respect to the intermediate 1-aryl-2-haloethylene compounds, the aryl radical is one that is capable of undergoing the reaction without degradation. The most preferred aryl groups are phenyl, thienyl and benzothienyl, although naphthyl and anthracyl groups can also be employed. Referring to the formula

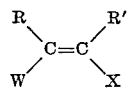

either R or R′ is chlorine or bromine if the four ring nucleus is desired in the final product, and chlorine is most preferred, and at least one of R and R′ is aryl or substituted aryl. Otherwise the choice of R and R′ depends upon what is desired in the end product. X is preferably chlorine. Typical compounds of this type are phenyltrichloroethylene; phenyltribromoethylene; naphthyltrichloroethylene; thienyltrichloroethylene; benzothienyltrichloroethylene; 2,2-bis(2-thienyl)dichloroethylene; para - chlorophenyltrichloroethylene; tolyltrichloroethylene; 1 - phenyl - 1 - fluorochlorofluoroethylene; paramethoxyphenyltrichloroethylene; 2,2 - diphenyldichloroethylene; 2,2 - diphenyldibromoethylene; 1,2 - diphenyldichloroethylene; 1,2-diphenyldibromoethylene; 2,2-bis(4-chlorophenyl)dichloroethylene; 2,2 - bis(4 - methoxyphenyl)dichloroethylene; 2,2 - ditolyldichloroethylene; 1,2-bis(4-chlorophenyl)dichloroethylene; 1,2-bis(4-methoxyphenyl)dichloroethylene; 1,2-ditolyldichloroethylene; 2-chlorobiphenyl; 2-bromibiphenyl; 2-chlorobitolyl; 2,2′-dichlorobiphenyl; 2-chloro-4,4′-dimethoxybiphenyl; 2,4,4′-trichlorobiphenyl.

Various aryl groups which can undergo the conditions of the reaction without degradation are suitable as initial starting materials. The most preferred aryl groups are phenyl, thienyl and benzothienyl, but others such as naphthyl and anthracenyl can also be employed.

The aryl groups in both the intermediate and the initial starting materials can be substituted or unsubstituted. The substituent groups can include such groups as halogen, alkyl, or alkoxy.

More particularly, the halogens can be fluorine, bromine, chlorine or iodine; and the alkyl and alkoxy groups preferably contain 1 to 10 carbon atoms. The preferred substituents are chlorine, methyl and methoxy.

In order to more fully illustrate the invention, the following examples are given, without intent to limit the invention thereby.

In the following Examples 1 to 5, the ratio of benzotrichloride to sulfur is increased in each succeeding example.

*Example 1*

After heating, under a distillation column, a solution of 2355 grams (12 moles) of benzotrichloride and 1056 grams (33 moles) of sulfur at 215–270° centigrade for 12 hours the formation of hydrogen chloride and sulfur chlorides has ceased. The reaction mixture, heated at 250–300° centigrade, was then distilled at a pressure of 0.05–0.1 millimeter of mercury directly into a receiver to give 514 grams of crude product. The distillation residue was pulverized and then extracted with carbon tetrachloride in a Soxhlet apparatus to yield 169 grams of addition product, melting point 212.5°–213.5° centigrade, shown by infrared analyses, and corroborated by a determination of sulfur content, to be [1]benzothieno[3,2-b][1]benzothiophene.

Analysis.—Calculated for $C_{14}H_8S_2$: S, 26.68%. Found: 26.99%.

*Example 2*

A solution of 782 grams (4.0 moles) of benzotrichloride and 256 grams (8.0 moles) of sulfur was heated under a distillation column at 225–250° centigrade for ten hours. Hydrogen chloride and sulfur chloride were formed and collected during this period. Two distillation fractions were then collected: Fraction 1, 361 grams, at 150–160° centigrade 0.03 millimeter of mercury pressure and Fraction 2, 100 grams, at 160–170° centigrade 0.06 millimeter of mercury pressure. After purification by redistilliation and recrystallization from methanol, Fraction 1 melted at 66–67° centigrade. The elemental analyses correspond to the composition calculated for 2-phenyl-3-chlorobenzo[b]thiophene.

Analysis.—Calculated for $C_{14}H_9SCl$: C, 68.70%; H, 3.71%; Cl, 14.5%; S, 13.1%. Found: C, 68.34%; H, 3.67%; Cl, 14.5%; S, 13.2%.

Fraction 2 was triturated with hot hexane and then crystallized twice from heptane. It was shown, by infrared analyses, to be 1.5% of 2-phenyl-3-chlorobenzo[b]thiophene and 93 percent of [1]benzothieno[3,2-b][1]benzothiophene.

*Example 3*

The mixture resulting from the reaction of 3822 grams (19.55 moles) of benzotrichloride and 941 grams (29.3 moles) of sulfur at 210–260° centigrade was fractionally distilled. Infrared analyses of the fractions established the following yields: recovered benzotrichloride, 761 grams (3.9 moles); 2-phenyl-3-chlorobenzo[b]thiophene, 1118 grams (4.57 moles); [1]benzothieno[3,2 - b][1]benzothiophene, 84 grams (0.345 mole); and tolane dichloride, 169 grams (0.678 mole).

*Example 4*

A solution of 1564 grams (8.0 moles) of benzotrichloride and 256 grams (8.0 moles) of sulfur was heated under a distillation column at 200–240° centigrade for 23 hours. During this period, 457 grams of sulfur chlorides (shown by vapor phase chromatography to be 15% sulfur dichloride and 84 percent sulfur monochloride) and 72 grams (1.97 moles) of hydrogen chloride was evolved and collected. Benzotrichloride was separated by distillation and then 427 grams of product was distilled off at 105–132° centigrade and 0.03–0.07 millimeter of mercury pressure. Comparison of the infrared spectrum of the product with the spectra of authentic samples of 2-phenyl-3-chlorobenzo[b]thiophene and of tolane tetrachloride demonstrated its composition to be 375 grams (1.53 moles) of the former and 21 grams (0.065 mole) of the latter. The recovered benzotrichloride was 757 grams (3.89 moles).

*Example 5*

Excess benzotrichloride was distilled from the mixture resulting from the heating of a solution of 635 grams (3.25 moles) of benzotrichloride and 52.2 grams (1.63 moles) of sulfur at 200–233° centigrade for 14 hours. The residue deposited was 33 grams of solid, shown by infrared analyses to contain 28 grams (0.087 mole) of tolane tetrachloride, which after recrystallizations from ethanol and from hexane melted at 162–162.5° centigrade.

Analysis.—Calculated for $C_{14}H_{10}Cl_4$: C, 52.54%; H, 3.15%; Cl, 44.31%. Found: C. 52.79%; H, 3.05%; Cl, 43.8%.

Distillation of the residue resulted in a distillate containing 62.1 grams of 2-phenyl-3-chlorobenzo[b]thiophene. An additional 3.2 grams was found in the final residue. Total recovered: 0.266 mole.

In the following Examples 6 to 8, the ratio of benzaldichloride to sulfur is increased in each succeeding example.

*Example 6*

The reaction of 644 grams (4.0 moles) of benzaldichloride and 256 grams (8.0 moles) of sulfur was effected, with the formation of hydrogen chloride, by heating the reagents at 200–265° centigrade for a period of 17 hours. The reaction mixture was pulverized and extracted with acetone. The acetone extract yielded 270 grams of crude product containing, as shown by infrared analyses, 189 grams (0.78 mole) of [1]benzothieno-[3,2-b][1]-benzothiophene and 19.7 grams (0.081 mole) of 2-phenyl-3-chlorobenzo[b]-thiophene.

*Example 7*

A solution of 322 grams (2.0 moles) of benzaldichloride and 64 grams (2.0 moles) of sulfur was heated at reflux, 200–300° centigrade. The exit of the condenser was connected in series to a trap cooled in a mixture of Dry Ice and acetone and to a flask containing water, serving as a hydrogen chloride trap. During the heating period of 18 hours, 144 grams (3.94 moles) of hydrogen chloride were collected, but no sulfur chloride was formed, as shown by its absence in the cold trap. The reaction mixture was pulverized and extracted with acetone in a Soxhlet apparatus. The acetone solution, after treatment with decolorizing charcoal and clay, yielded on concentration, 122 grams of crude product containing, as shown by infrared analyses, 8.4 grams (0.034 mole) of 2-phenyl-3-chlorobenzo[b]thiophene and 99 grams (0.41 mole) of [1]benzothieno[3,2-b][1]benzothiophene.

*Example 8*

A solution of 322 grams (2.0 moles) of benzaldichloride and 32 grams (1.0 mole) of sulfur was heated at 200–295° centigrade for 29 hours. The reaction mixture was purified by distillation at a pressure of 0.02 millimeter of mercury in a rotating-evaporator type apparatus where the pot was suspended in a bath heated to 220° centigrade. A product fraction of 126 grams was collected which contained, as shown by infrared analyses, 16 grams (0.067 mole) of [1]benzothieno[3,2 - b][1]benzothiophene and 105 grams (0.43 mole) of 2-phenyl-3-chlorobenzo[b]thiophene.

*Example 9*

A solution of 100 grams of redistilled Fraction 1 of Example 2 (0.41 mole) of 2-phenyl-3-chlorobenzo[b]thiophene and 13,1 grams (0.41 mole) of sulfur was heated at 250–274° centigrade for 11 hours with concurrent formation and collection of 13.5 grams (0.37 mole) of hydrogen chloride. A portion of the reaction mixture was sublimed at reduced pressure. The sublimate was recrystallized from heptane to give fine colorless, plates, melting point 216–217° centigrade, of the following elemental analyes, corresponding to [1]benziothieno[3,2-b][1]benziothiophene.

Analysis.—Calculated for $C_{14}H_8S_2$: C, 69.96%; H, 3.36%; S, 26.68%. Found: C, 69.7%; H, 3.32%; S, 26.69%.

*Example 10*

To a refluxing solution of 140 milligrams (0.58 millimole) of [1]benzothieno[3,2-b][1]benzothiophene (from Example 9) and 25 milliliters of anhydrous ethanol was added 185 milligrams (0.87 millimole) of 1,3,5-trinitrobenzene. The solution was heated at reflux for four minutes and then was stored at 10° centigrade for 48 hours. The precipitated red crystals were washed with cold ethanol and dried, they had a melting point of 181–182° C. The melting point reported in the literature is 175° centigrade.

Analysis.—Calculated for $C_{26}H_{14}N_6O_{12}S_2$: C, 46.83%; H, 2.12%. Found: C, 46.75%; H, 1.88%.

Example 11

A stirred solution of 20 grams (0.0625 mole) of tolane tetrachloride and 4.0 grams (0.125 mole) of sulfur was heated at 240–255° centigrade for 4.5 hours. During this period, 3.97 grams of sulfur chlorides and 2.0 grams (0.055 mole) of hydrogen chloride were collected. Analysis of the reaction mixture by infrared spectrometer showed the presence of 10 grams (0.041 mole) of 2-phenyl-3-chlorobenzo[b]thiophene, 1.1 grams (0.0046 mole) of [1]benzothieno[3,2-b][1]benzothiophene and 2.8 grams (0.011 mole) of tolane dichloride.

Example 12

A solution of 30 grams (0.121 mole) of trans-tolane dichloride and 3.86 grams (0.121 mole) of sulfur was heated with stirring at 260° centigrade for four hours. Hydrogen chloride, 4.3 grams (0.12 mole) was evolved. Analysis, by comparison of its infrared spectrum with the spectra of authentic samples, showed the reaction mixture to contain 1.9 grams (0.0078 mole) of trans-tolane dichloride, 1.6 grams (0.0065 mole) of cis-tolane dichloride, 20 grams (0.083 mole) of 2-phenyl-3-chlorobenzo[b]thiophene and 2.2 grams (0.0092 mole) of [1]benzothieno[3,2-b][1]benzothiophene. The reaction mixture was extracted with hot hexane. The solid precipitated by the addition of methanol to the hexane solution was crystallized from methanol to give 14.2 grams (0.058 mole) of 2-phenyl-3-chlorobenzo[b]thiophene. Further recrystallization from methanol gave product melting at 68–68.8° centigrade.

*Analysis.*—Calculated for: Cl, 14.49%. Found: Cl, 14.3%.

Example 13

A solution of 10 grams (0.0402 mole) of cis-tolane dichloride and 1.29 grams (0.0403 mole) of sulfur was heated with stirring at 250° centigrade for three hours. During this period 1.34 grams (0.0368 mole) of hydrogen chloride was evolved. By infrared analysis the crude reaction mixture was shown to contain 0.45 gram (0.0018 mole) of trans-tolane dichloride, 0.31 gram (0.00123 mole) of cis-tolane dichloride, 6.9 grams (0.028 mole) of 2-phenyl-3-chlorobenzo[b]thiophene and 0.71 gram (0.0029 mole) of [1]benzothieno[3,2-b][1]benzothiophene.

Example 14

A solution of 40 grams (0.129 mole) of bis(4-methoxyphenyl)-2,2-dichloroethylene and 4.16 grams of sulfur (0.130 mole) was heated at 205–210° centigrade for 1.5 hours. Hydrogen chloride, 5.3 grams was collected. The reaction mixture was extracted with ten 75 milliliters portions of acetone. The residue, 34 grams remaining from the concentrations of the combined decolorizing charcoal treated extracts was distilled in a short-path distillation apparatus at 110–165° centigrade at two microns of mercury pressure. The distillate was triturated with heptane and the soluble portion, 1.03 grams after stripping, was redistilled in a molecular still at 95° centigrade and two microns of mercury pressure to give 0.36 gram of crude crystalline product which, after crystallization from isopropanol-acetone solution and recrystallization from ethanol-acetone solution, gave 0.1 gram of white product, melting point 181–181.5° centigrade, 3,8-dimethoxy[1]benzothieno[2,3-b][1]benzothiophene.

*Analysis.*—Calculated for $C_{16}H_{12}O_2S_2$: C, 63.98%; H, 4.03%; S, 21.33%. Found: C, 64.04%; H, 3.99%; S, 21.17%.

Example 15

A solution of 50 grams (0.181 mole) of bis(p-tolyl)-2,2-dichloroethylene and 8.67 grams (0.271 mole) of sulfur was heated at 180–210° centigrade for four hours. Hydrogen chloride, 9.5 grams (0.26 mole) was collected. The reaction mixture was extracted with hot acetone and the acetone solution was treated with decolorizing charcoal and stripped to a residue. The residue was washed with hexane and then was sublimed under reduced pressure. The sublimate was crystallized from a solution of toluene and methanol and then was recrystallized from hexane to give a product melting at 147–148° centigrade.

*Analysis.*—Calculated for $C_{16}H_{12}S_2$: C, 71.60%; H, 4.51%; S, 23.89%. Found: C, 71.26%; H, 4.25%; S, 23.58%.

These analyses correspond to the calculated elemental composition of 3,8-dimethyl[1]benzothieno[2,3-b][1]benzothiophene.

Example 16

Hydrogen chloride, 53.5 grams (1.47 moles) was formed when a solution of 278 grams (0.784 mole) of DDT (Bis(4-chlorophenyl)-2,2,2-trichloroethane) and 25.1 grams (0.784 mole) of sulfur was heated at 200–230° centigrade for eight hours. The reaction mixture after trituration with ethanol and then with methanol weighed 200 grams and was shown (infrared analysis) to contain 160 grams (0.51 mole) of 2,6-dichloro-3-(4-chlorophenyl)benzo[b]thiophene and 30 grams (0.092 mole) of 3,8-dichloro[1]benzothieno[2,3-b][1]benzothiophene.

Example 17

Using the procedure of Example 16, the new compound 2-chloro-3-phenylbenzo[b]thiophene is readily prepared from diphenyl-2,2,2-trichloroethane.

Example 18

A solution of 150 grams (0.478 mole) of bis(4-chlorophenyl)-2,2-dichloroethylene and 22.7 grams (0.708 mole) of sulfur was stirred and heated at 240–260° centigrade for ten hours. During this period 25.9 grams (0.71 mole) of hydrogen chloride was collected. The reaction mixture was separated, by extraction with hot acetone, into two portions. Infrared analysis showed the acetone soluble portion to contain 74.7 grams (0.238 mole) of 2,6-dichloro-3-(4-chlorophenyl)benzo[b]thiophene and 43.8 grams (0.142 mole) of 3,8-dichloro[1]benzothieno[2,3-b][1]benzothiophene. A portion of the acetone soluble fraction was crystallized from isopropyl alcohol and then was sublimed under reduced pressure. The sublimate was crystallized from hexane to give a product melting at 121–121.6° centigrade.

*Analysis.*—Calculated for $C_{14}H_7Cl_3S$: C, 53.61%; H, 2.25%; Cl, 33.92%; S, 10.22%. Found: C, 54.0%; H, 2.39%; Cl, 33.5%; S, 9.66%.

Crystallization of a portion of the acetone-insoluble fraction from toluene followed by recrystallization from chloroform gave a sample melting at 270–270.5° centigrade.

*Analysis.*—Calculated for $C_{14}H_6Cl_2S_2$: C, 54.38%; H, 1.96%; Cl, 22.93%; S, 20.73%. Found: C, 54.4%; H, 2.0%; Cl, 23.1%; S, 20.95%.

Example 19

Using the procedure of Example 18, the compound 2-chloro-3-phenylbenzo[b]thiophene is prepared from 2,2-diphenyldichloroethylene.

Example 20

A solution of 354 grams (1.0 mole) of DDT and 64 grams (2.0 moles) of sulfur was heated at 230–250° centigrade for 17 hours. During this period, 95 grams (2.6 moles) of hydrogen chloride were evolved. The crude product was crystallized from xylene to give 196 grams of product. Further purification was effected by successive recrystallizations from xylene, chlorobenzene and chloroform to give a sample melting at 271–2° centigrade and having an elemental composition corresponding to 3,8-dichloro[1]benzothieno[2,3-b][1]benzothiophene.

*Analysis.*—Calculated for $C_{14}H_6Cl_2S_2$: C, 54.38%; H, 1.96%; Cl, 22.93%; S, 20.73%. Found: C, 53.77%; H, 2.12%; Cl, 23.15%; S, 20.56%.

Example 21

A solution of 41.3 grams (0.148 mole) of (4-chlorophenyl)-1,2,2-tetrachloroethane and 4.7 grams (0.148 mole) of sulfur was heated at 210–240° centigrade until hydrogen chloride evolution had ceased (four hours). The residue was distilled. After removing a foreshot, 25.1 grams of distillate, which solidified on cooling, were collected at 52° centigrade and 0.025 millimeter of mercury pressure. After recrystallization from alcohol the distillate melted at 87–88° centigrade.

*Analysis.*—Calculated for $C_8H_3Cl_3S$: Cl, 44.8%; S, 13.5%. Found: Cl, 44.3%; S, 13.2%.

These analyses correspond to the calculated elemental composition of 2,3,6-trichlorobenzo[b]thiophene.

Example 22.—Sulfone of [1]benzothieno[3,2-b][1]benzothiophene

A solution of 93 grams (0.38 mole) of [1]benzothieno[3,2-b][1]benzothiophene, 930 milliliters of acetic acid, and 230 grams of a thirty percent solution of aqueous hydrogen peroxide was heated to its reflux temperature over a one-half hour period, held briefly at reflux, and then cooled. The product was filtered off, washed first with methanol and then with hexane, to yield 103 grams of material which was then recrystallized from toluene and analyzed.

*Analysis.*—Calculated for 5 - dioxy[1]benzothieno-[3,2-b][1]benzothiophene: C, 61.74%; H, 2.96%; S, 23.55%. Found: C, 61.7%; H, 3.36%; S, 23.03%.

Infrared analysis showed the presence of a sulfonyl group, indicating the structure to be:

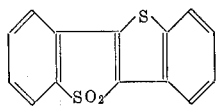

The compounds made by processes previously outlined are of the general formula:

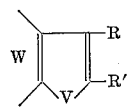

where W is an aryl nucleus fused to the thiophene ring which may be substituted, R and R' are fluorine, bromine, chlorine, aryl or substituted aryl substituents or the atoms of an aromatic ring or ring system, and V is a divalent sulfur or sulfonyl (—$SO_2$—) radical. Substituent groups on such aryl groups and on W include halogen, alkyl, and alkoxy.

In these and the other formulas of the materials reacted and made according to this invention, the carbon-containing radicals and substituents can be of various types and can be located at any of a variety of positions in the molecule, as indicated. Although the radicals should not be narrowly interpreted, usually they will be of 1 to 20 carbon atoms, preferably usually of 1 to 8 carbon atoms.

Included within the compounds made by the process of this invention are the benzo[b]thiophenes,

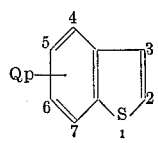

wherein Q represents substituents on the benzene nucleus and p the number of substituents, and derivatives thereof which result from substitutions in the 2 and 3 positions of the compound. The substituent groups Q are defined hereinbefore, and p can be 0 to 4. When substituted by atoms of the 2 and 3 positions of another benzothiophene molecule the result is [1]benzothieno[2,3-b][1]benzothiophene; where Q and P are as previously defined:

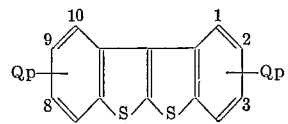

With the sulfur atoms on opposite sides of the molecule, the [3,2-b]isomer results:

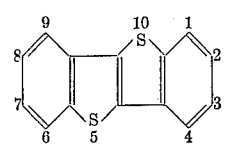

[1]benzothieno[3,2-b][1]benzothiophene. When Q is chlorine, the compounds of the invention are represented by the formulae:

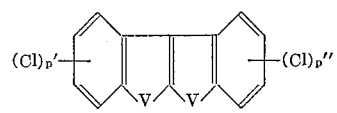

and

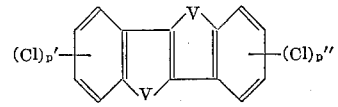

wherein p' and p" are integers from 0 to 2 and $p'+p''$ is an integer from 1 to 2, and V is selected from the group consisting of divalent sulfur and sulfonyl.

Typical products of the invention which have fused thiophene ring systems are: 2,3-dichlorobenzo[b]thiophene; 2,3-dibromobenzo[b]thiophene; 2,3-difluorobenzo[b]thiophene; 2-chloro-3-phenylbenzo[b]thiophene; 2-phenyl-3-chlorobenzo[b]thiophene; 2-bromo-3-phenylbenzo[b]thiophene; 2 - chloro - 3-(4-methylphenyl)benzo[b]thiophene; 2 - (4 - methylphenyl) - 3-chlorobenzo[b]thiophene; 2-chloro-3-(4-chlorophenyl)benzo[b]thiophene; 2-chloro - 3 - (4-methoxyphenyl)benzo[b]thiophene; 2,3-dichloronaptho[b]thiophene; 2,3,6 - trichlorobenzo[b]thiophene; 2,3 - dichloro-6-methylbenzo[b]thiophene; 2,3-dichlorothieno[2,3 - b]thiophene; 2,3 - dichlorobenzothieno[2,3-b]thiophene; 2-chloro-3-(2-thienyl)thieno[3,2-b]thiophene; 2-chloro-3-(3-[1]benzothienyl)thieno[3,2-b][1]benzothiophene; 2,3 - dichlorothieno[2,3-b:5,4-b']dithiophene; [1]benzothieno[2,3-b][1]benzothiophene; [1]benzothieno[3,2-b][1]benzothiophene; 1,10-dichloro[1]benzothieno[2,3 - b][1]benzothiophene; 3,8-dibromo[1]benzothieno[2,3 - b][1]benzothiophene; 2,9-dimethyl[1]benzothieno[2,3-b][1]benzothiophene; 3,8-dibutyl[1]benzothieno[2,3 - b][1]benzothiophene; 4,7-dimethoxy[1]benzothieno[2,3-b][1]benzothiophene; 3,8-dipropoxy[1]benzothieno[2,3 - b][1]benzothiophene; [1]benzothieno[2,3-b][1]naphtho[2,3 - b]thiophene; [1]benzothieno[2,3 - b]thieno[2,3 - b]thiophene; [1]benzothieno[2,3 - b]thieno[2,3-b:5,4-b']dithiophene; thieno[3,2-b]thieno[2,3-b:5,6-b'][1]dibenzothiophene; and the corresponding sulfones of the foregoing compounds.

Such derivatives of benzo[b]thiophene are pesticidal in nature as illustrated by the following examples:

Example 23

2-phenyl-3-chlorobenzo[b]thiophene was chlorinated to a chlorine content of 31.6 percent, and 41.6 percent, respectively.

Tomato plants infested with spores of *Alternaria solani*, the causative fungal organism of "early blight" disease, were sprayed with an aqueous dispersion of the test chemicals at concentrations of 0.04%. Similarly infested tomato plants were left unsprayed for comparison. Approximately one week later, when symptoms became evident on unsprayed plants, the degree of control on the sprayed plants was estimated by estimating the reduction in lesions on the sprayed plants and a substantial and significant degree of control was found to have been obtained with both chlorinated test chemicals.

*Example 24*

2-phenyl-3-chlorobenzo[b]thiophene was chlorinated to a total chlorine content of 41.6 percent. When incorporated into nutrient agar at concentrations as low as 19 parts per million, it completely prevented development of bacterial colonies when the agar was innoculated with *Staphlacoccus aureus.*

*Example 25*

2-phenyl-3-chlorobenzo[b]thiophene was chlorinated to a total chlorine content 38 percent. When incorporated in soil infested with *Meloidogyne incognita* at the rate of 125 parts per million, it completely prevented the appearance of "root knot" disease (which would otherwise have been caused by the nematode population) on cucumber seedlings planted therein.

*Example 26*

Adult pea aphids were sprayed with [1]benzothieno[3,2-b][1]benzothiophene formulated as a 0.1 percent solution until thoroughly wet and transferred to similarly sprayed pea plants. 48 hours later all the aphids were dead.

*Example 27*

Tomato plants infested with spores of *Alternaria solani,* the causative fungal organism of "early blight" disease were sprayed with an aqueous dispersion of 3,8-dichloro [1]benzothieno[2,3-b][1]benzothiophene at a concentration of 0.04 percent. Similarly infested tomato plants were left unsprayed for comparison. Approximately one week later, when symptoms were evident on the unsprayed plants, the degree of control of the sprayed plants was estimated by estimating the reduction in lesions. Substantial control was found to have been obtained, which was evident to a viewer.

*Example 28*

Tomato plants infested with spores of *Alternaria solani,* the causative fungal organism of "early blight" disease were sprayed with an aqueous dispersion of the sulfone of Example 22 at a concentration of 0.04 percent. Similarly infested tomato plants were left unsprayed for comparison. Approximately one week later, when symptoms were evident on the unsprayed plants, substantial control was noted on the sprayed plants.

The invention has been described in respect to illustrative examples but is not limited to them. It is evident that equivalents may be substituted for elements of the invention without departing from the scope thereof.

What is claimed is:

1. The process which comprises reacting a starting material selected from the group consisting of (a) 

and (b) 

where X' is selected from the group consisting of chlorine and bromine; Y' is selected from the group consisting of hydrogen, chlorine and bromine; Z' is selected from the group consisting of chlorine, bromine, and the radical (ArCX$_2$'—), where Ar is selected from aryl and a substituted aryl substituent having at least one position adjacent the Ar—C bond substituted by hydrogen; X$^2$ is selected from the group consisting of fluorine, chlorine, bromine, aryl, and a substituted aryl substituent having at least one position adjacent the aryl-carbon bond substituted by hydrogen; W is selected from the group consisting of aryl and a substituted aryl substituent substituted by hydrogen in at least one position adjacent the W—C bond; in the presence of sulfur, at an elevated temperature.

2. The process which comprises reacting a 1-aryl-2-haloethylene compound of the formula

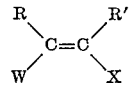

wherein W is selected from the group consisting of aryl and substituted aryl having at least one position adjacent the W—C bond substituted by hydrogen; R and R' are selected from the group consisting of fluorine, chlorine, bromine, aryl, substituted aryl, and atoms of an aromatic ring system; and X is selected from the group consisting of chlorine and bromine; with sulfur at an elevated temperature.

3. The process which comprises reacting a 1-aryl-2-haloethylene of the formula

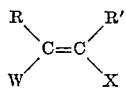

wherein W is selected from the group consisting of aryl and substituted aryl having at least one position adjacent the W—C bond constituted by hydrogen; one of the members R and R' is selected from the group consisting of aryl and substituted aryl, and the other member is selected from the group consisting of chlorine, and bromine; and X is selected from the group consisting of chlorine and bromine, with sulfur at an elevated temperature.

4. The process for preparing a compound having the fused thienothiophene structure which comprises (1) reacting a starting material having the formula

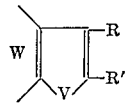

wherein W is selected from the group consisting or aryl and substituted aryl; one of the members R and R' is selected from the group consisting of aryl and substituted aryl having at least one position adjacent the R—C bond substituted by hydrogen, and the other member is selected from the group consisting of chlorine and bromine; and V is selected from the group consisting of divalent sulfur and sulfonyl, in the presence of sulfur at an elevated temperature; and (2) recovering a thienothiophene compound as a product of the process.

5. 2,6-dichloro-3-(4-chlorophenyl)benzo[b]thiophene.

6. A composition of matter of the formula selected from the group consisting of

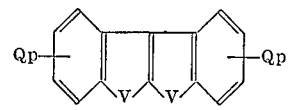

and

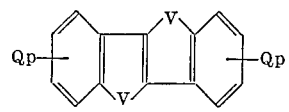

where Q is alkoxy of 1 to 10 carbon atoms, *p* is a number from 1 to 4 and V is selected from the group consisting of divalent sulfur and sulfonyl.

7. The compound

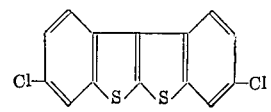

8. The compound

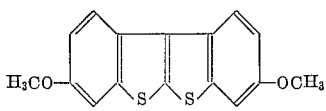

9. The process which comprises reacting benzotrichloride in the presence of sulfur, at a temperature in the range from about 100 to about 300 degrees centigrade.

10. The process which comprises reacting benzaldichloride in the presence of sulfur, at a temperature in the range from about 100 to about 300 degrees centigrade.

11. The process which comprises reacting phenyl-1,2,2,2,-tetrachloroethane in the presence of sulfur, at a temperature in the range from about 100 to about 300 degrees centigrade.

12. The process which comprises reacting diphenyl-2,2,2-trichlorethane in the presence of sulfur, at a temperature in the range from about 100 to about 300 degrees centigrade.

13. The process which comprises reacting 1,2-diphenyl-tetrachloroethane in the presence of sulfur, at a temperature in the range from about 100 to about 300 degrees centigrade.

14. The process for preparing a compound having a fused thiophene-ring system which comprises (1) reacting 1,2-diphenyldichloroethylene with sulfur, at a temperature in the range from about 100 to about 300 degrees centigrade, and (2) recovering a thiophene compound as a product of the process.

15. The process for preparing a compound having a fused thiophene-ring system which comprises (1) reacting 2,2-diphenyldichloroethylene with sulfur, at a temperature in the range from about 100 to about 300 degrees centigrade, and (2) recovering a thiophene compound as a product of the process.

16. The process which comprises reacting a compound of the formula:

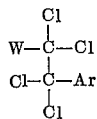

wherein W is selected from the group consisting of aryl and a substituted aryl substituent having at least one position adjacent the W—C bond substituted by hydrogen, and Ar is selected from the group consisting of aryl and a substituted aryl substituent having at least one position adjacent the Ar—C bond substituted by hydrogen, in the presence of sulfur, at an elevated temperature.

17. A composition of matter of the formula

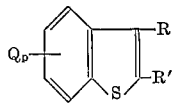

wherein one of the members R and R' is substituted phenyl wherein the substituents are selected from the group consisting of halogen, alkyl of 1 to 10 carbon atoms and alkoxy of 1 to 10 carbon atoms, and the other member is chlorine, Q is selected from the group consisting of halogen, alkyl of 1 to 10 carbon atoms and alkoxy of 1 to 10 carbon atoms, and $p$ is a number from 1 to 4.

18. A mixture of compounds having the formula:

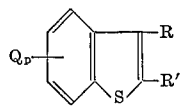

wherein one of the members R and R' is substituted phenyl wherein the substituents are selected from the group consisting of halogen, alkyl of 1 to 10 carbon atoms and alkoxy of 1 to 10 carbon atoms, and the other member is chlorine, Q is selected from the group consisting of halogen, alkyl of 1 to 10 carbon atoms and alkoxy of 1 to 10 carbon atoms, and $p$ is a number from 1 to 4.

19. The process which comprises reacting a 1-aryl-2-haloethylene wherein the aryl radical has at least one position adjacent the aryl-carbon bond substituted by hydrogen and wherein the halogen is selected from the group consisting of chlorine and bromine, with sulfur at an elevated temperature.

20. A composition of matter of the formula selected from the group consisting of

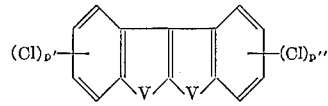

and

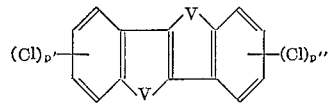

wherein $p'$ and $p''$ are integers from 0 to 2 and $p' + p''$ is an integer from 1 to 2, and V is selected from the group consisting of divalent sulfur and sulfonyl.

21. A composition of matter of the formula

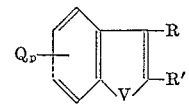

wherein one of the members R and R' is substituted phenyl, wherein the substituents are selected from the group consisting of halogen, alkyl of 1 to 10 carbon atoms and alkoxy of 1 to 10 carbon atoms and the other member is chlorine, Q is selected from the group consisting of halofen, alkyl of 1 to 10 carbon atoms and alkoxy of 1 to 10 carbon members, $p$ is a number from 1 to 4, and V is selected from the group consisting of divalent sulfur and sulfonyl.

References Cited by the Examiner

UNITED STATES PATENTS

| | | | |
|---|---|---|---|
| 2,393,925 | 1/1946 | Morris et al. | 167—33 |
| 2,397,423 | 3/1946 | Ladd | 167—33 |
| 2,786,851 | 3/1957 | Mahan | 260—330.5 |
| 2,876,235 | 3/1959 | Voegtli | 260—330.5 |
| 2,980,697 | 4/1961 | Dann | 260—330.5 |
| 3,043,887 | 7/1962 | Becke | 260—650 |
| 3,070,606 | 12/1962 | Anderson | 260—330.5 |

FOREIGN PATENTS

| | | |
|---|---|---|
| 195,682 | 2/1958 | Austria. |

OTHER REFERENCES

Gelblum: Chemical Abstracts, vol. 51 (1957), p. 15547.

Groggins: Unit Processes in Organic Synthesis, McGraw-Hill Book Co., New York (1958), pp. 248–9.

Hartough et al.: Compounds With Condensed Thiophene Rings, Interscience Pub., Inc., New York (1954), pp. 385–6.

Murthy et al.: Jour. Scientific and Industrial Research, vol. 20B, No. 4 (April 1961), pp. 169–176.

Staudinger et al.: Chemical Abstracts, vol. 15 (1921), pp. 1135–6.

WALTER A. MODANCE, *Primary Examiner.*

JOHN D. RANDOLPH, *Examiner.*

J. A. PATTEN, *Assistant Examiner.*